(12) United States Patent
Aikas et al.

(10) Patent No.: US 9,002,790 B2
(45) Date of Patent: Apr. 7, 2015

(54) HOSTED STORAGE LOCKING

(75) Inventors: Erkki Ville Juhani Aikas, Seattle, WA (US); David Erb, Seattle, WA (US)

(73) Assignee: Google Inc., Mountain View, CA (US)

( * ) Notice: Subject to any disclaimer, the term of this patent is extended or adjusted under 35 U.S.C. 154(b) by 689 days.

(21) Appl. No.: 13/232,450

(22) Filed: Sep. 14, 2011

(65) Prior Publication Data

US 2013/0066833 A1    Mar. 14, 2013

(51) Int. Cl.
     *G06F 17/30*     (2006.01)
     *G06F 17/00*     (2006.01)

(52) U.S. Cl.
     CPC ................................. *G06F 17/30289* (2013.01)

(58) Field of Classification Search
     USPC .................................. 707/634, 636; 715/513
     See application file for complete search history.

(56) References Cited

U.S. PATENT DOCUMENTS

| | | | |
|---|---|---|---|
| 7,797,276 B1 * | 9/2010 | Yang .............................. | 707/636 |
| 8,352,870 B2 * | 1/2013 | Bailor et al. .................. | 715/751 |
| 2007/0192524 A1 | 8/2007 | Chan et al. | |
| 2008/0317068 A1 | 12/2008 | Sagar et al. | |
| 2011/0119668 A1 | 5/2011 | Calder et al. | |
| 2011/0196838 A1 | 8/2011 | Zunger et al. | |

OTHER PUBLICATIONS

Notification of Transmittal of the International Search Report and The Written Opinion of the International Searching Authority, or the Declaration issued in PCT/US2012/055133 on Nov. 23, 2012, 7 pages.

* cited by examiner

*Primary Examiner* — Yicun Wu
(74) *Attorney, Agent, or Firm* — Fish & Richardson P.C.

(57) ABSTRACT

A hosted storage system receives a request from a requester to access a hosted resource. The hosted resource includes a binary large object. The hosted storage system providing hosted storage to a plurality of clients that are coupled to the hosted storage system. A copy of the hosted resource is created. A copy message including the copy of the hosted resource is provided to the requester. The hosted resource is maintained in the hosted storage system while the requester modifies the copy of the hosted resource. A message is received from the requester. The messages include a modified copy of the hosted resource. It is determined that the hosted resource has not been modified since the copy of the hosted resource was created. The hosted resource is replaced with the modified copy of the hosted resource.

14 Claims, 7 Drawing Sheets

HOSTED STORAGE LOCKING

TECHNICAL FIELD

This document relates to hosted storage.

BACKGROUND

Hosted, or cloud-based storage, refers to off-site or remote data storage that is typically provided by a third party. The third party may implement the hosted storage in a data center, and provide access to the hosted storage over a network, such as the Internet.

SUMMARY

In one aspect, a method is performed by one or more processors. The method includes receiving, at a hosted storage system, a request from a requester to access a hosted resource. The hosted resource includes a binary large object. The hosted storage system providing hosted storage to a plurality of clients that are coupled to the hosted storage system. The method further includes creating a copy of the hosted resource. The method further includes providing a copy message includes the copy of the hosted resource to the requester. The method further includes maintaining the hosted resource in the hosted storage system while the requester modifies the copy of the hosted resource. The method further includes receiving a message from the requester. The messages include a modified copy of the hosted resource. The method further includes determining that the hosted resource has not been modified since the copy of the hosted resource was created. The method further includes replacing, in response to the determining and in the hosted storage system, the hosted resource with the modified copy of the hosted resource. The request from a requester, the copy message, and the message from the requester are Hypertext Transfer Protocol messages.

Implementations can include any, all, or none of the following features. The method further includes providing includes providing a version indicator of the hosted resource to the requester for modification. The method further includes receiving the modified copy of the hosted resource includes receiving the provided version indicator. The method further includes determining includes comparing the provided version indicator with a current version indicator of the hosted resource. The method further includes replacing includes incrementing the version indicator. The version indicator includes a plurality of values, each value associated with a version of the hosted resource or a metadata value associated with the hosted resource. Comparing the provided version indicator with a current version indicator of the hosted resource includes comparing a subset of the plurality of values of the provided version indicator with a subset of the plurality of values of the current version indicator. The hosted storage system includes a datastore configured to store hosted resources; a metadata store configured to store metadata related to hosted resources, the metadata including access control lists; and an interface configured to receive the request from a requester to access a hosted resource, to provide the copy message to the requester, and to receive the message from the requester including a modified copy of the hosted resource. The determining and the replacing are performed as part of a single operation. The method further includes receiving, at the hosted storage system and before the replacing, a second request from a second requester to access a hosted resource. The method further includes creating a second copy of the hosted resource. The method further includes providing a copy of the hosted resource to the second requester for modification. The method further includes receiving a second modified copy of the hosted resource, the second modified copy created by the second requester. The method further includes determining that the hosted resource has been modified since second copy of the hosted resource was created. The method further includes providing, to the second requester, a modification rejection message. The method further includes modifying a portion of the hosted resource; and wherein the modification rejection message indicates modified portion of the hosted resource.

In one aspect, a method is performed by one or more processors. The method includes receiving, at a hosted storage system, a request from a requester to access a hosted resource, the hosted storage system providing hosted storage to a plurality of clients that are coupled to the hosted storage system. The method further includes creating a copy of the hosted resource. The method further includes providing a copy message includes the copy of the hosted resource and a version indicator of the hosted resource to the requester, the version indicator includes a plurality of values, each value associated with a version of the hosted resource or a metadata value associated with the hosted resource. The method further includes maintaining the hosted resource in the hosted storage system while the requester modifies the copy of the hosted resource. The method further includes receiving a message from the requester includes a modified copy of the hosted resource and the provided version indicator. The method further includes determining that the hosted resource has not been modified since the copy of the hosted resource was created by comparing the provided version indicator with a current version indicator of the hosted resource. The method further includes replacing, in response to the determining and in the hosted storage system, the hosted resource with the modified copy of the hosted resource. The method further includes incrementing, in response to the determining and in the hosted storage system, the version indicator.

In one aspect, a computer system includes a hosted storage system configured to provide hosted storage to a plurality of clients that are coupled to the hosted storage system. The hosted storage system is further configured to receive a request from a requester to access a hosted resource. The hosted resource includes a binary large object. The hosted storage system is further configured to create a copy of the hosted resource. The hosted storage system is further configured to provide a copy message that includes the copy of the hosted resource to the requester. The hosted storage system is further configured to maintain the hosted resource in the hosted storage system while the requester modifies the copy of the hosted resource. The hosted storage system is further configured to receive a message from the requester that includes a modified copy of the hosted resource. The hosted storage system is further configured to determine that the hosted resource has not been modified since the copy of the hosted resource was created. The hosted storage system is further configured to replace, in response to the determining and in the hosted storage system, the hosted resource with the modified copy of the hosted resource. The system further includes a requestor configured to provide to the hosted storage system the request. The requestor is further configured to receive from the hosted storage system the copy message. The requestor is further configured to modify the copy of the hosted resource. The requestor is further configured to provide to the hosted storage system the message. The request from a requester, the copy message, and the message from the requester to access a hosted resource are Hypertext Transfer Protocol messages.

Implementations can include any, all, or none of the following features. Providing the copy message includes providing a version indicator of the hosted resource to the requester for modification. Receiving the modified copy of the hosted resource includes receiving the provided version indicator; determining includes comparing the provided version indicator with a current version indicator of the hosted resource. Replacing includes incrementing the version indicator. The version indicator includes a plurality of values, each value associated with a version of the hosted resource or a metadata value associated with the hosted resource. Comparing the provided version indicator with a current version indicator of the hosted resource includes comparing a subset of the plurality of values of the provided version indicator with a subset of the plurality of values of the current version indicator. The hosted storage system includes a datastore configured to store hosted resources; a metadata store configured to store metadata related to hosted resources, the metadata including access control lists; and an interface configured to receive the request from a requester to access a hosted resource, to provide the copy message to the requester, and to receive the message from the requester including a modified copy of the hosted resource. The determining and the replacing are performed as part of a single operation. The hosted storage system is further configured to receive, at the hosted storage system and before the replacing, a second request from a second requester to access a hosted resource; create a second copy of the hosted resource; provide a copy of the hosted resource to the second requester for modification; receive a second modified copy of the hosted resource, determine that the hosted resource has been modified since second copy of the hosted resource was created; and provide, to the second requester, a modification rejection message. The system further including the second requester configured to provide to the hosted storage system the second request; receive from the hosted storage system the copy of the hosted resource; modify the copy of the hosted resource; and provide to the hosted storage system the second modified copy of the hosted resource; and receive the modification rejection message. The hosted storage system is further configured to modify a portion of the hosted resource; and wherein the modification rejection message indicates modified portion of the hosted resource.

The details of one or more implementations are set forth in the accompanying drawings and the description below. Other features and advantages will be apparent from the description and drawings, and from the claims.

Various implementations of the subject matter described here may provide one or more of the following advantages. For example, examination of version indicator before storing data can prevent the loss of changes to the data. A hosted storage system that uses version indicator can provide concurrent access of data object to many clients while maintaining state of the data object. Tracking multiple version values can allow a system to lock part of a data object while keeping other parts of the data object unlocked.

DETAILED DESCRIPTION

A hosted storage system can receive, store, and serve data objects to clients. When a client requests the data object, the object is returned with a version indicator. The client may modify the object, and send the modified object back to the hosted storage system, along with the same version indicator. If the version indicator of the uploaded data object matches the version indicator of the data object stored in the hosted storage system, the hosted storage system can replace the stored data object with the uploaded (and modified) data object. If the version indicator does not match (for example, because the object at the hosted storage system has been modified in the interim), the hosted storage system can reject the uploaded data object and report the rejection to the client.

Figure 1:
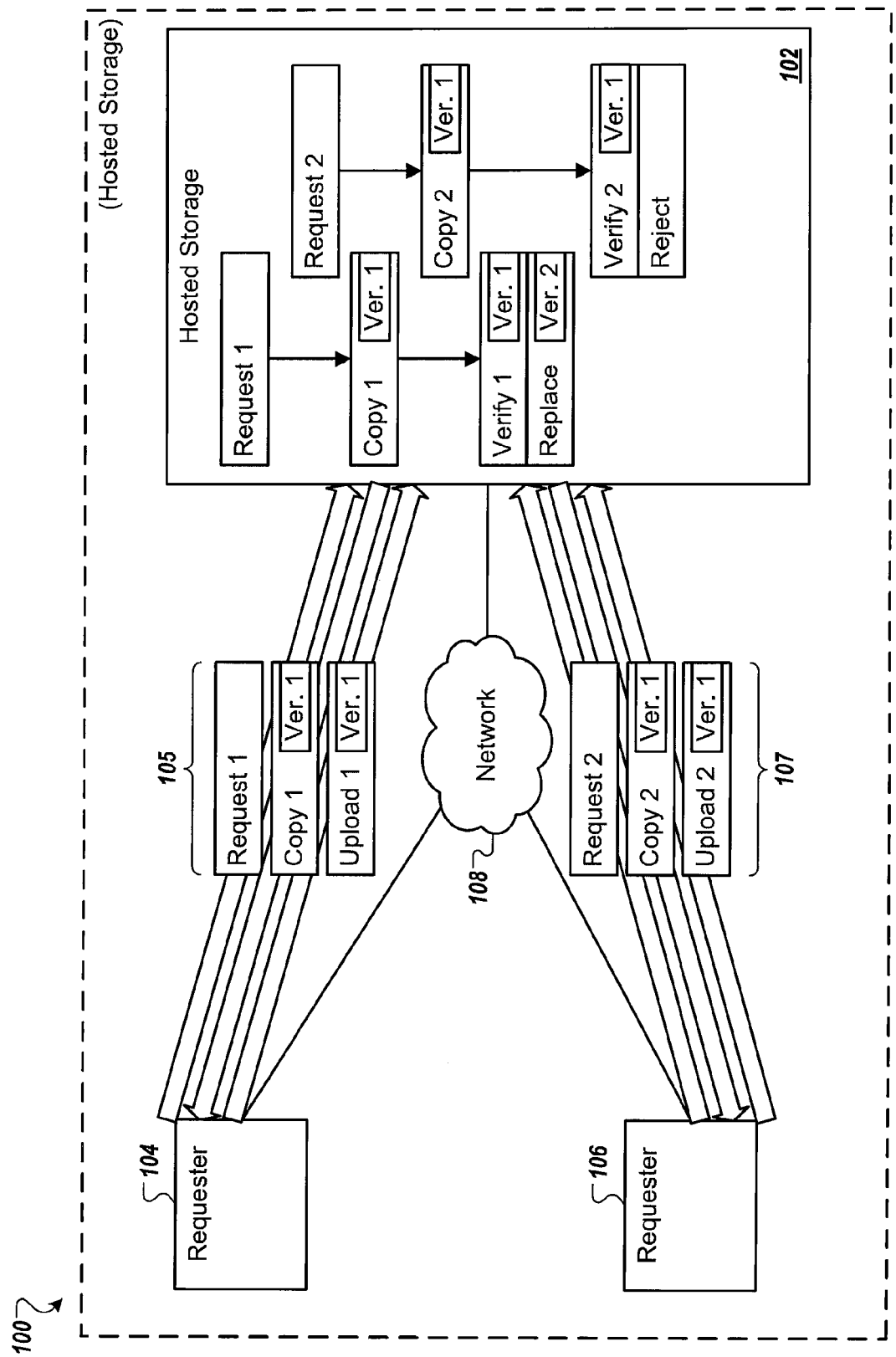
FIG. 1 is a schematic diagram showing an example of a system for providing hosted storage with version locking.

FIG. 1 is a schematic diagram showing an example of a system 100 for providing hosted storage with version locking. The system 100 includes one or more requesters 104, 106 and a hosted storage system 102 connected by a network 108, such as the Internet. The requesters may be client devices implemented, for example, by the computing device 700 or the mobile device 750 described with respect to FIG. 7. The hosted storage system 102 may be implemented using one or more server systems and storage systems, and may be implemented in a data center. An example of an implementation of the hosted storage system 102 is hosted storage service 220 shown in FIG. 2. Hosted storage system 102 may be implemented, for example, using the computing device 700 or the mobile device 750 described with respect to FIG. 7.

In the system 100, the hosted storage system 102 can store data objects and provide applications with access to those stored objects. The applications may be running on computing devices geographically separate from each other. The stored data objects can be associated with a version indicator that is incremented, or otherwise changed, when the stored data object (and/or metadata associated with the object) is changed.

Requesters 104 and 106 can use the hosted storage system 102 for data object storage. In some implementations, the requesters 104 and 106 may have permission to read and write the same data object in the hosted storage system. For example, the requesters 104 and 106 may be used by users that are part of the same user groups. As members of the same user group, both users may be authorized to access a shared data objet in the hosted storage system 102. The requesters 104 and 106 can communicate with the hosted storage system 102 through a network 108 such as a local area network, a wide area network, or the Internet.

The requesters 104 and 106 can send and receive messages 105 and 107, respectively. The messages 105 and 107 may include messages to request a data object, receive a copy of the data object, and to upload a modified copy of the data object. The messages 105 and 107 may be used, for example, to modify the data object. In some implementations, the data objects may be opaque binary large objects (blobs) in the hosted storage system 102, and edits to the data object may only be possible by the requesters 104 and 406. Modifications to the data object by the requesters 104 and 106 can include, but are not limited to, edits to the data object, changes to the object's metadata, deletion of the object, and replacement of the contents of the data object with different content.

The hosted storage 102 can maintain a version indicator for each data object in the hosted storage 102. This version indicator can include, for example, numeric values that are incremented when a data object in the hosted storage 102 is modified. The hosted storage 102 can include the version indicator with the data object as the data object is sent to the requester 104 and 106. This version indicator can be tracked and updated by the hosted storage 102 and provided to any client that requests a copy of the data object. Any copy of the data object provided by the hosted storage 102 to any client can include the current version indicator of the data object. In the upload messages 105 and 107, the updated data objects can include the same version indicator. In this example, the version indicator is shown as an integer value (1), but other types of version indicator are possible.

The requesters 104 and 106 can operate independently and asynchronously on the same data object from the hosted storage 102. These operations, along with the messages 105 and 107, are not instantaneous. This can create a race condition in which, for example, the requester 106 accesses the data object while the requester 104 is operating on a local copy of the data object. In this example, the requester 104 may make a change to the data object that the requester 106 does not have access to.

The hosted storage system 102 can control the state of the data object by only accepting uploads of a data object where the uploaded data object version information matches the stored data object version indicator. In this example, the uploaded data object from the requester 104 may be accepted, as it contains the same version indicator (1) as the stored data object version indicator (1). To accept the object, the hosted storage system 102 can replace the hosted data object with the uploaded data object. As a part of the same acceptance, the data object version indicator can be incremented (to 2). Later, when the upload message 107 is received by the hosted storage 102 from the requester 106, the hosted storage system 102 may reject the uploaded data object because the version indicator of the uploaded data object (1) is different than the version indicator of the hosted data object (2). As part of rejecting the uploaded data object from the requester 106, the hosted storage system 102 can send a rejection message (not shown) to the requester 106, store the uploaded data object as a different object, accept only a part of the uploaded data object (e.g. only metadata) and/or take another action.

Figure 2:
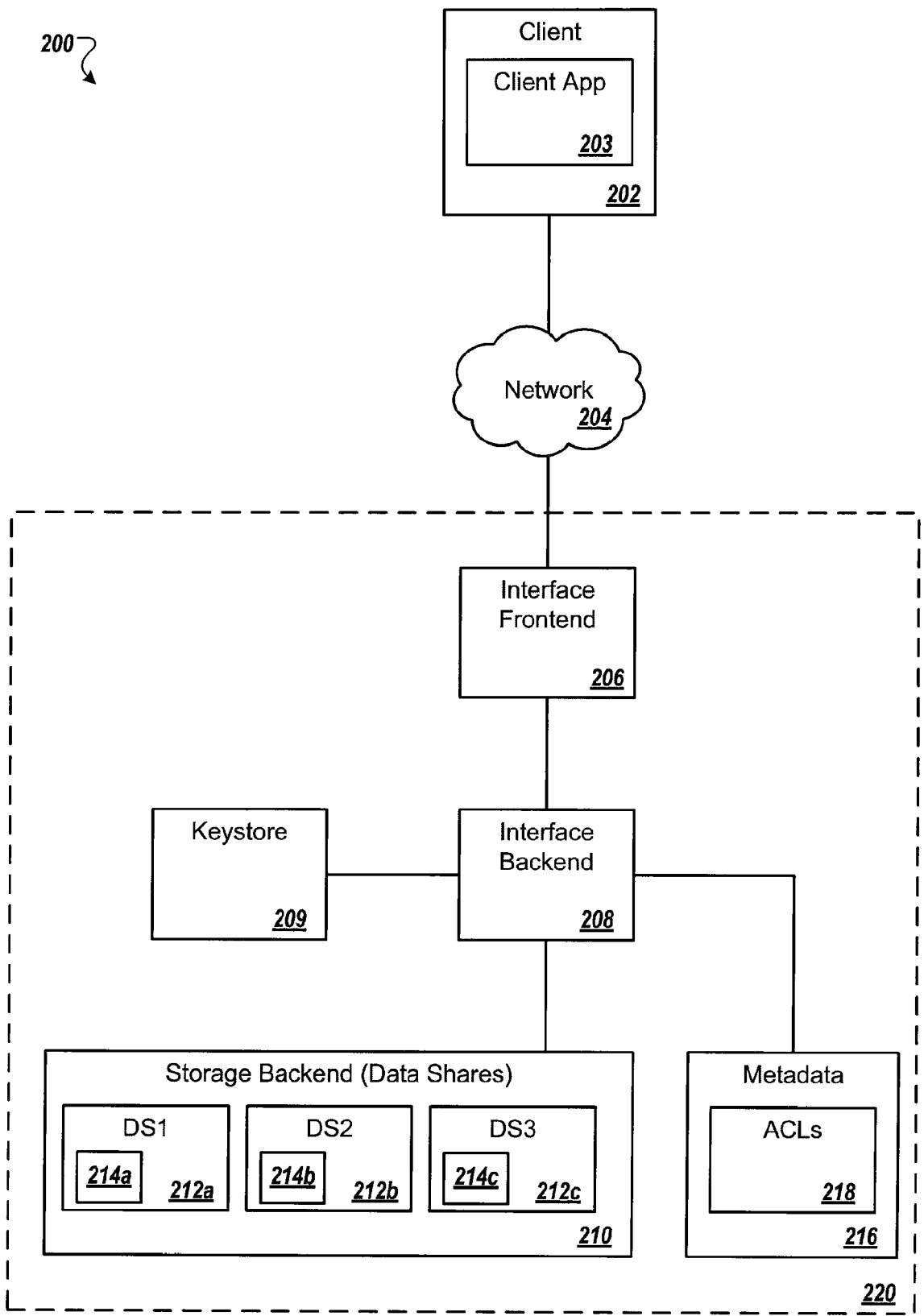
FIG. 2 is a block diagram showing an example of a system for providing hosted storage and accessing the hosted storage from a client device.

FIG. 2 is a block diagram showing an example of a system 200 for providing hosted storage and accessing the hosted storage from a client device 202. In some implementations, a hosted storage service 220 can provide access to stored data by applications running on computing devices geographically separate from each other, provide offsite data backup and restore functionality, provide data storage to a computing device with limited storage capabilities, and/or provide storage functionality not implemented on a computing device.

The system 200 can provide scalable stores for storing data objects. The client device 202 can upload data objects to the hosted storage service 220 and control access to the uploaded data objects. Access control can include a range of security levels, from keeping data securely confidential to publishing it without restrictions. Data stored in hosted storage service 220 can be secured from unauthorized access. The hosted storage service 220 can use a simple and consistent application programming interface, or API, which can allow arbitrary quantities of structured or unstructured data to be kept private or shared between individuals, organizations, or with the world at large. The client device 202 can store data in the hosted storage service 220 for mutual business reasons (e.g., submission of work product ordered by the owner of the hosted storage service 220), or for use in data processing by other services (e.g., images uploaded are used to automatically and dynamically create a photo gallery web page.)

Figure 6:
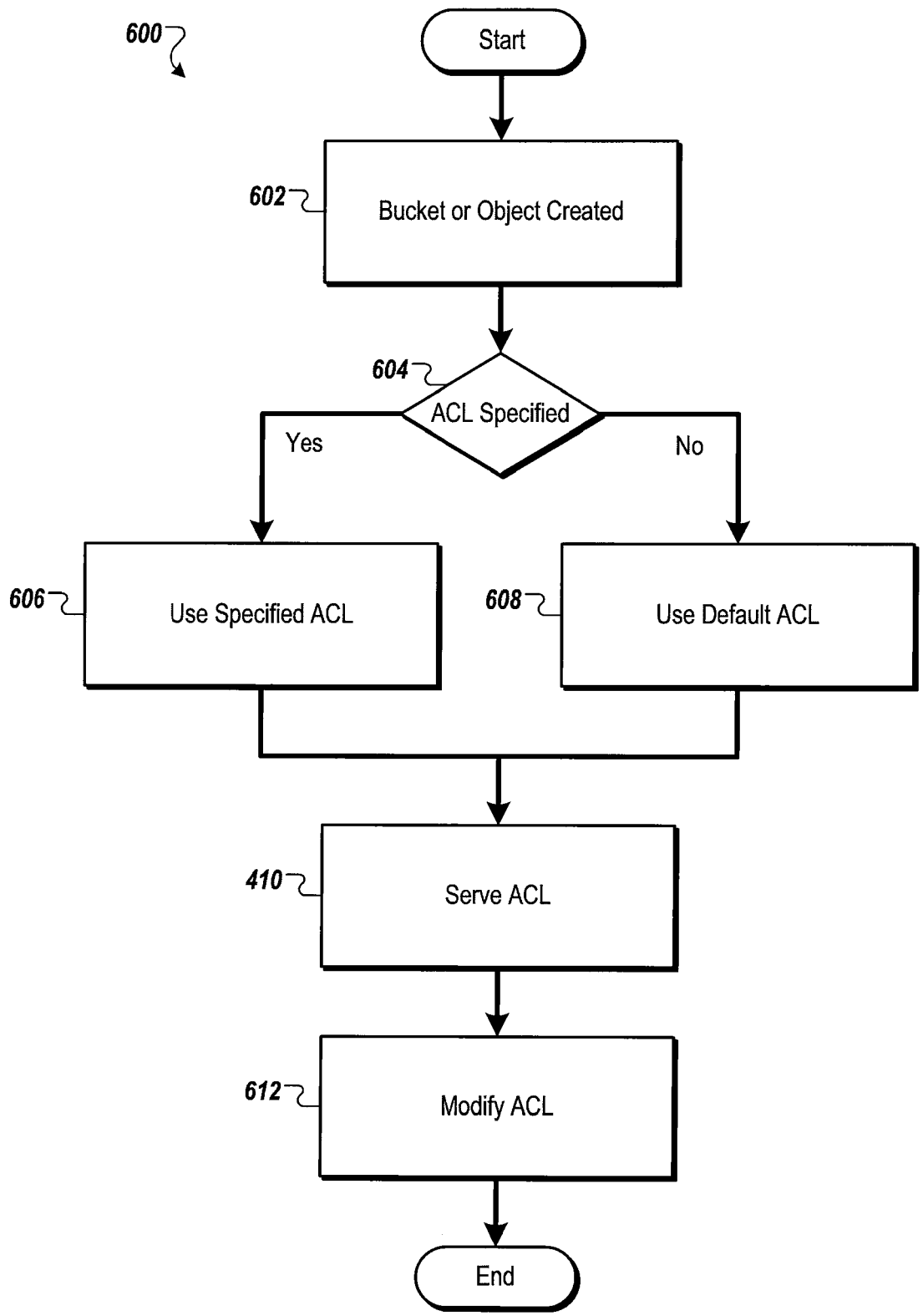
FIG. 6 is a flow chart showing an example lifecycle of an access control list.

The client device 202 can be implemented using a computing device, such as the computing device 600 or the mobile device 650 described with respect to FIG. 6. The client device 202 can communicate with the hosted storage service 220 via a network 204, such as the Internet. The client device 202 can communicate across the network using communication protocols such as, for example, one or more of Transmission Control Protocol/Internet Protocol (TCP/IP), Hypertext Transfer Protocol (HTTP), Hypertext Transfer Protocol Secure (HTTPS), Secure Shell Remote Protocol (SSH), or Application Program Interfaces (API). While only a single client device 202 is shown, there can be multiple client devices communicating across the network 204 with the hosted storage service 220 and/or other services and devices.

The hosted storage service 220 can be implemented such that client applications such as a client application 203 can store, retrieve, or otherwise manipulate data objects in the hosted storage service 220. The hosted storage service 220 can be implemented by one or more server devices, which can be implemented using a computing device, such as the computing device 600 or mobile device 650 described with respect to FIG. 6. For example, the hosted storage service 220 can be implemented by multiple server devices operating in the same, or different, data centers.

The hosted storage service 220 generally includes an interface frontend 206, an interface backend 208, a storage backend 210, metadata 216 for objects stored in the storage backend 210, and a keystore 209. In general, the interface frontend 206 may receive requests from and send responses to the client device 202. For instance, the hosted storage service 220 can be implemented as a Web Service with a corresponding set of Web Service Application Programming Interfaces (APIs). The Web Service APIs may be implemented, for example, as a Representational State Transfer (REST)-based HTTP interface or a Simple Object Access Protocol (SOAP)-based interface.

An interface frontend 206 can receive messages from the client 202 and parse the request into a format usable by the hosted storage service 220, such as a remote procedure call (RPC) to an interface backend 208. The interface frontend 206 writes responses generated by the hosted storage service 220 for transmission to the client 202. In some implementations, multiple interface frontends 206 are implemented, for example to support multiple access protocols.

The interface frontend 206 can include a graphical front end, for example to display on a web browser for data access. The interface frontend 206 can include a sub-system to enable managed uploads and downloads of large files (e.g., for functionality such as pause, resume, and recover from time-out). The interface frontend 206 can monitor load information and update logs, for example to track and protect against denial of service (DOS) attacks.

As described above, the Web Service API may be a REST-based HTTP interface. In a REST-based interface, a data object is accessed as a resource, uniquely named using a URI, and the client application 203 and service 220 exchange representations of resource state using a defined set of operations. For example, requested actions can be represented as verbs, such as by HTTP GET, PUT, POST, HEAD, and DELETE verbs. The GET verb may be used to retrieve an object, while the HEAD verb may be used to retrieve information about an object without retrieving the object itself. The DELETE verb may be used to delete an object from the hosted storage service 220. The PUT and POST verbs may be used to upload an object to the service 220. PUT requests can come from the client 202 and contain authentication and authorization credentials and object metadata in a header, such as an HTTP header. POST requests can be received when a client 202 wants to upload from a web browser form. The form POST upload protocol for the hosted storage service 220 can involve multiple required form fields to provide authentication, authorization and object metadata. More generally, any of the API requests may include credentials for authentication and authorization, for example, in a header of the request. For example, an authorization header may be included in the REST requests, which includes an access key to identify the entity sending the request.

Alternatively, or additionally, a user can be authenticated based on credentials stored in a browser cookie, which gets appended to the API requests. If no valid cookie is present, a redirect to an authentication frontend can be generated, and the authentication frontend can be used to generate the browser cookie. The authentication frontend can be used by systems and services in addition to the hosted storage service 220 (e.g., if the organization operating the hosted storage service 220 also operates other web services such as email service.) A user can also or alternatively be authenticated based on authentication credentials from an external credentialing service or an external service that includes credentialing functionally. User or group identifier information can be calculated from the external service's credential information. Requests sent by the client 202 to the interface frontend 206 can be translated and forwarded to the external service for authentication.

In general, objects stored in the hosted storage service 220 can be referenced by object identifiers. The hosted storage service 220 can define namespaces to which a valid object identifier must conform. For example, the namespace may require that object identifiers be a sequence of Unicode characters whose UTF-8 encoding is at most 1024 bytes long. As another example, the namespace may require that object identifiers be globally unique identifiers (GUIDs), which may be 128-bit integers.

Objects can be stored in hosted storage service 220 in buckets. In some examples, each bucket is uniquely named in the hosted storage service 220, each object is uniquely named in a bucket, and every bucket and object combination is unique. Objects may be uniquely identified by a URI that includes the bucket name and the object name, and identifies the hosted storage service 220. For example, an object named "long/song.mp3" in a bucket named "music" could be specified using a URI pattern such as http://s.hostedstoragesystem.com/music/long/song.mp3 or http://music.s.hostedstoragesystem.com/long/song.mp3. Alternatively, the user of the client 202 can create a bucket named www.music.org, publish a CNAME alias redirecting that to http://music.s.hostedstoragesystem.com, and address the object as http://www.music.org/long/song.mp3. In some examples, buckets do not nest.

The interface backend 208 can handle request authentication and authorization, can manage data and metadata, and can track activity such as for billing. The interface backend 208 can provide functionality for independent frontend/backend scaling for resource utilization and responsiveness under localized heavy loads. Data management can be encapsulated in the interface backend 208 while communication serving can be encapsulated in the interface frontend 206. The interface backend 208 can isolate security mechanisms from the client-facing interface frontend 206. Version locking of hosted resources can be accomplished by the interface backend 207.

The interface backend 208 can expose an interface usable by both the interface frontend 206 and other systems. In some examples, some features of the interface backend 208 are accessible only by an interface frontend (not shown) used by the owners of the hosted storage service 220 (internal users). Such features can include those needed for administrative tasks (e.g., resolving an object reference to a low level disk address.) The interface backend 208 can handle request authentication (e.g., ensuring a user's credentials are valid) and authorization (e.g., verifying that a requested operation is permitted.) The interface backend can also provide encryption and decryption services to prevent unauthorized access to data, even by internal users.

A keystore 209 can store encryption keys for data objects, where the encryption keys have themselves been encrypted by the interface backend 208. The encrypted keys can carry associated metadata that is cryptographically bound to the key itself, and are referred here to as wrapped keys. From the point of view of the interface backend 208, the wrapped keys can be opaque objects. To obtain the cleartext key of a wrapped key for use (e.g., to encrypt or decrypt a data object) the interface backend 208 can provide the wrapped key and client authentication credentials to the keystore 209. The keystore 209 can verify, based in part on the wrapped key's metadata, that the provided authentication credential is sufficient to authorize release of the key, and if so, can return the unwrapped key to the interface backend 208. The interface backend 208 can use the key to encrypt or decrypt the data object and then can discard the key.

In some examples, the encryption key is a symmetric key that can be used to both encrypt and decrypt an object. In some examples, a wrapped key can have associated metadata indicating multiple users or groups authorized to access the cleartext key. In some examples, the keystore 209 can copy a wrapped key and rewrap the key for a different principle (e.g., containing different metadata).

The interface backend 208 can manage metadata 216 associated with data objects, for example in a structured data format such as a database (e.g., MySQL or BigTable). User-specified names labeling the buckets can be completely defined within the metadata 216, and object metadata 216 can map a resource name to one or more data shares 212 storing the resource. The metadata 216 can also contain bucket and object creation times, object sizes, hashes, and access control lists 218 (ACL 218) for both buckets and objects. The interface backend 208 can log activity and track storage consumption to support accounting for billing and chargebacks. In some examples, this includes quota monitoring in each dimension in which customers are charged (e.g., reads, writes, network transfers, total storage in use.)

The ACLs 218 define who is authorized to perform actions on corresponding buckets or objects, and the nature of the permitted actions. The ACLs 218 can be an unordered list of {scope, role} pairs, plus Boolean flags. The scope may define a user or group of users, and the role may define the access permissions for the user or group. In some examples, the union of all {scope, role} pairs can define access rights. In some examples, more specific {scope, role} pairs override more general ones.

Table 1: Bucket Roles below shows a list of example roles that can be included in ACLs 218 for buckets.

Table 2: Object Roles below shows a list of example roles that can be included in ACLs 218 for data objects.

TABLE 1

Bucket Roles

| Role | Capabilities |
| --- | --- |
| READ | Can list the bucket's contents. Cannot create or delete objects. |
| WRITE | READ capabilities plus ability to create and delete objects in the bucket. |
| FULL_CONTROL | WRITE capabilities plus ability to read and write the bucket ACL. |

TABLE 2

Object Roles

| Role | Capabilities |
| --- | --- |
| READ | Can read the object. |
| FULL_CONTROL | READER capabilities plus ability to read and write the object ACL. |

Scopes can be defined to a single user or a group of users. In one implementation, those users with a FULL_CONTROL role (and therefore able to modify the ACL for a given bucket or object) may define a group of users, and then provide a role for the group. For example, a group of users may be managed by the hosted storage service 220 (or, more generally, by the service provider that provides the hosted storage service 220) for reasons other than storage permissions (for example, Google Groups at groups.google.com) and those groups may be identified by a single username or other identifier associated with the group of users, an e-mail address associated with the group of users (which may or may not also correspond to an identifier of the group), or a domain name associated with a group. This may allow a user to specify a preexisting group managed by the service provider that is already defined by the identifier, e-mail address, or domain name. Similarly, users may be able to specify a group of users (for example, by user id or e-mail address) and associate an access key with the group. This may allow for the formation of ad-hoc groups for the management of storage permissions, rather than groups already managed by the service provider.

In this way, a group of users can be given a particular role simply by managing the role of the group. Similarly, if the ACL is associated with a bucket containing a number of objects, or the ACL is otherwise associated with multiple objects, the role with respect to those objects can be easily changed by simply changing the role of the group.

Table 3: Scopes below shows a list of example scopes that can be included in ACLs 218 for buckets and/or data objects.

TABLE 3

Scopes

| Name | Description |
| --- | --- |
| Service ID | A single authenticated user specified by username. |
| Email Address | A single user specified by an email address. |
| Service Group ID | A group of users managed by the hosted storage service 220 and specified by an associated identifier. |
| Invite Token | One or more users with access to a one time use digital token. |
| Group-Restricted Key | One or more users with access to a permanent use digital key. |
| All Service Users | All authenticated users of the hosted storage service 220. |
| All Users | All users, no authentication. Can be anonymous or semi-anonymous. |

The FULL_CONTROL role can represent all possible capabilities, such as those assigned to an object or bucket owner connected to a financially responsible party. The bucket owner can be configured to always have FULL_CONTROL for the bucket. In general, the bucket and/or object owner can create or modify scopes and roles in the corresponding ACLs, but in some implementations the pair {bucket owner, FULL_CONTROL} may be prevented from being removed from the bucket ACL 218 (or the object ACL). To create an object, a user can have write permission on the bucket, which can be granted by WRITE and FULL_CONTROL. WRITE permission on the bucket can imply permission to delete or overwrite an object in the bucket. Additional constraints can disallow certain modifications to ACLs 218. In some examples, it is possible to create an object that the bucket owner cannot read.

The storage backend 210 can contain multiple datastores 212a-212c. Although three datastores 212 are shown, more or fewer are possible. Each of the datastores 212a-212c can store data objects 114a-214c in a particular format. For example, data store 212a can store a data object 214a as a Binary Large Object (BLOB), data store 212b can store a data object 214b in a distributed file system (e.g., Network File System, Google File System), and data store 212c can store a data object 214c in a structured data format such as a database (e.g., MySQL, BigTable.)

The interface backend 208 can ensure safe modification to the hosted resources such as data objects 214, metadata 216, and ACLs 218 by enforcing version locking of the resources. Version locking can apply to access of a hosted resource by elements within the hosted storage system 220 such as the interface backend 208, or by external elements such as the client application 203.

The interface backend can store a version indicator for each data object 214 in the metadata 216. This version indicator can reflect the current version of the data object 214, and can be managed by the interface backend 208 when the data object 214 or its associated metadata 216 or ACL 218 is changed. When an element such as the client application 202 requests the data object 214 (e.g. with a GET HTTPS request), the interface backend 208 can provide the version indicator as well as the data object 214 in response.

When a request to write to the data object 214 is received by the interface backend 208 (e.g. a PUT HTTPS request), the interface backend 208 can compare the version indicator in the request to the version indicator stored in the metadata 216. If the version indicators match, the interface backend 208 can process the write request. If they do not match, the interface backend 208 can reject the request, and send a message to the element with the reason for the rejection.

The process used to determine that the version indicators match can be based on the format of the version indicator. One format of version indicator may be a single integer that is incremented any time a data object 214 or the associated metadata 216 is modified. In this case, the two integers can be compared. Another format of the version indicator may include a vector of integer values. Each element of the vector may correspond to the data object 214 or a single metadata 216 field. When a request to write the data object 214 or a metadata 216 is received, the interface backend 208 can compare only the vector elements of the version indicator that correspond to the requested data object 214 or metadata 216 field. In other alternatives, the version indicators may contain non-integer values such as byte strings, or ascii values.

For example, the hosted storage system 102 may have metadata 216 fields for object size, object hash, ACL 218, and mime-type field. The associated version indicator can be a five dimensional vector: [object version, size version, hash version, ACL version, mime-type version]. The interface backend 208 can receive a write request, including the example version indicator, to write only to the mime-type metadata 216 field. In this case, the interface backend 208 can compare only the "mime-type version" dimension of the received version indicator to the "mime-type version" dimension of the stored version indicator. If those two dimension match, even if other dimensions do not, the interface backend 208 can accept and process the received write request.

Figure 3:
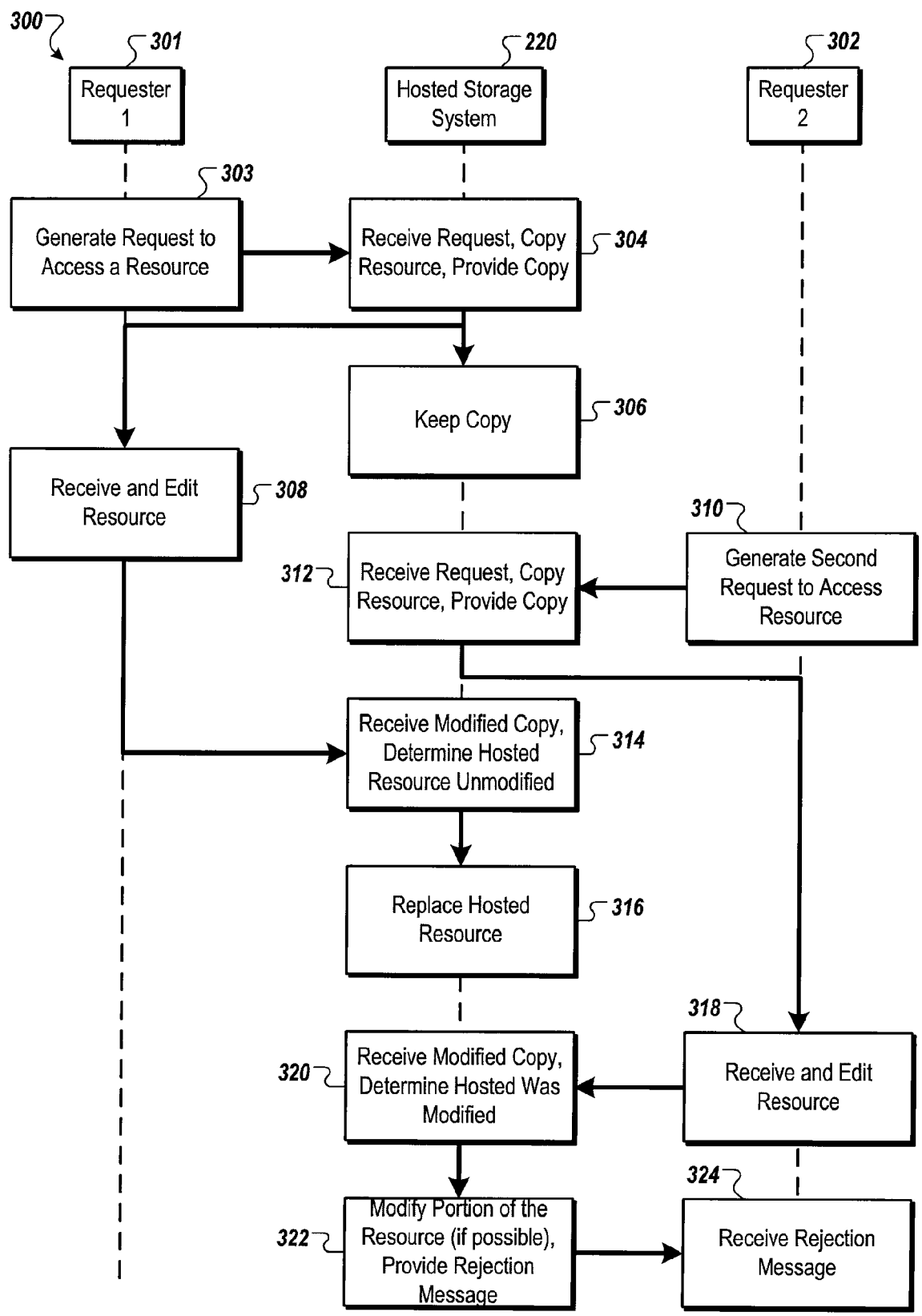
FIG. 3 is a swim lane diagram showing an example of a process for version locking a hosted data object.

FIG. 3 is a swim lane diagram showing an example of a process 300 for version locking a hosted data object. The process 300 can be performed by, for example, hosted storage system 220 and requesters 301 and 301, and for clarity of presentation, the description that follows uses the system 200 as the basis for describing the process. Another system, or combination of systems, may be used to perform the process 400. In this example, the requester 104 is an external client 202 attempting to change the contents of a data object, and the requester 106 is an internal component of the hosted storage system 220 attempting to change the ACL 218 of the same data object. In other examples, the requesters 104 and 106 may both be internal or both may be external clients.

The requester 301 generates a request for a hosted resource (303). For example, the requester 301 may, at user direction, identify a data object 214 such as a hosted document to access for editing. The requester 301 can create a message, such as an HTTPS GET or HEAD message, requesting a copy of data object 214, and the request may include the user's authentication information. The hosted storage system 220 receives a request from the requester 301 to access the hosted resource (304). The hosted storage system 220 provides hosted storage to a plurality of clients that are coupled to the hosted storage system. For example, the hosted storage system 220 can receive and authenticate the request.

The hosted storage system 220 creates a copy of the hosted resource. For example, the hosted storage system 220 may read a copy of the data object 214 out of the datastore 212 and decrypt the data object 214. The hosted storage system 220 provides the copy of the hosted resource to the requester 301. For example, the hosted storage system 220 can send a message with the copy of the data object 214 to the requester 301. The hosted storage system 220 provides a version indicator with the hosted resource to the requester 301. For example, version indicator of the data object 214 may be stored in the metadata 216 in association with the data object 214. This version indicator may be included in the message to the requester 301.

In some implementations, the message to the requester 301 can be an HTTPS response to the GET or HEAD message requesting the data object 214. The HTTPS response can include a custom HTTP header, in this example x-sequence-header, that includes the version indicator, an example of which is shown below.

```
HTTP/1.1 200 OK
Content-Type: application/xml; charset=UTF-8
Date: Fri, 22 Jul 2011 16:27:56 GMT
Expires: Fri, 22 Jul 2011 16:27:56 GMT
Cache-Control: private, max-age=0
x-sequence-header: 2
X-Frame-Options: SAMEORIGIN
header: Content-Length: 2475
```

The hosted storage system 220 maintains the hosted resource while the requester 301 modifies the copy of the hosted resource (306). For example, the hosted storage system 220 may not need to modify, move, or delete the data object 214 or the version indicator in the process of copying and sending the data object 214 or the version indicator. However, in some implementations, some modification, movements, or deletions may be performed.

The requester 301 receives the hosted resource from the hosted storage system 220 and edits the hosted resource (308). For example, the requester 301 may receive the data object 214, parse, and display the data object 214 as a document to the user. The user may edit the document, and instruct the requester 301 to save the document.

The requester 302 generates a second request to access the hosted resource (310). For example, while the user is editing the document, the requester 302 can create a request to change the ACLs 218 for a group of data objects 214, including the data object 214 being edited by the user. The second request to access the hosted resource is received from a second requester (312).

The hosted storage system 220 creates a copy of the hosted resource and the hosted storage system 220 provides the copy of the hosted resource to the requester 302. For example, the hosted storage system 220 may read a copy of the data object 214 out of the datastore 212 and decrypt the data object 214. The hosted storage system 220 can then send a message with the copy of the data object 214 to the requester 301. The hosted storage system 220 provides a version indicator with the hosted resource to the requester 302. For example, version indicator of the data object 214 may be stored in the metadata 216 in association with the data object 214 and this version indicator may be retrieved and included in the message to the requester 302. In some implementations, this may effectively create the same message as sent in 304.

The hosted storage system 220 receives a modified copy of the hosted resource from the requester 301 (314). For example, the requester 301 may, in response to the user's instruction to save the document, send a message to the hosted storage system 220 with the modified data object 214, along with the version indicator that the requester 301 received in 308. The hosted storage system 220 receives the version indicator of the modified copy of the hosted resource from the requester 301. For example, the hosted storage system 220 can parse the version indicator in the message from the requester 301. The hosted storage system 220 determines that the hosted resource has not been modified since the copy of the hosted resource was created. For example, the hosted storage system 220 can compare the version indicator from the requester 301 with the version indicator in the metadata 216 for the data object 214. If the version indicators match, the hosted storage system 220 can determine that the hosted copy of the data object 214 has not been modified since the copy of the data object 214 was created.

In some implementations, the message from the requester 301 can be a HTTPS PUT, POST, or DELETE message. This message can include a custom HTTP header, in this example x-if-sequence-number-match, that includes the version indicator from the requester 301, an example of which is shown below.

```
PUT /sampleput/xxx HTTP/1.1
Host: datarepository.example.com
Accept-Encoding: identity
Content-MD5: filbWD4p/PTGCwYwaCa+Mg==
Content-Length: 15
x-api-version: 2
Content-Type: application/octet-stream
x-if-sequence-match: 3
User-Agent: Agentname
```

The version indicator indicates a plurality of values, each value associated with the version of the hosted resource or a metadata value associated with the hosted resource. For example, the version indicator may include an array of integers or other values. Each entry in the array may correspond to a different feature, aspect, or part of a data object 214.

Table 4: Version Array below shows an example version array that may be used in the hosted storage system 220. The first row lists a label describing an aspect of a data object 214, and the second row shows an example current version.

TABLE 4

| Version Array | | | |
| --- | --- | --- | --- |
| Opaque object | ACL | Metadata field 1 | Metadata field 2 |
| 12 | 3 | 128 | 4 |

The hosted storage system 220 compares the version indicator of the modified copy of the hosted resource with the version indicator of the hosted copy of the hosted resource. For example, if the version indicator is an integer or an array of integers, the hosted storage system 220 can compare the integers or array of integers to determine if they have the same values. Comparing the version indicators includes comparing a subset of the plurality of values of the provided version indicator with a subset of the plurality of the values of the current version indicator. For example, the x-if-sequence-number-match header field may indicate that only a portion of the data object 214 was modified (e.g. the Opaque object in the document example), and only that portion of the version arrays may be compared. The hosted storage system 220 may ignore the other portions of the version arrays. That is, if the Metadata field 1 has changed, but the Opaque object field has not, the hosted storage system 220 may determine that, for the purposes of the uploaded data object 214, the stored data object 214 has not been modified.

The hosted storage system 220 replaces the hosted resource with the modified copy of the hosted resource (316). For example, the hosted storage system 220 may store the uploaded data object 214 in the datastore 212, and the fully qualified name of the data object 214 (e.g. bucket/name) may now resolve to the uploaded data object 214. In some implementations, the older copy of the data object 214 may be deleted, archived, or renamed. For example, the hosted storage system 220 may rename the old data object 214, and it may be saved in the same bucket. In this case, the name portion of the fully qualified name may be different. In another example, the old data object 214 may be moved to a different bucket. In this case, the bucket portion of the fully qualified name may be different.

The hosted storage system 220 increments the version indicator of the hosted resource. For example, for a version indicator that is a single integer, the integer value is increased by 1. In another example with a version indicator that includes a vector of integers; the hosted storage system 220 increments one or more integers, depending on the feature, aspect, or part of the data object 214 that is changed.

The determining and the replacing are performed by the hosted storage system 220 as part of a single operation. For example, once the hosted storage system 220 determines that the data object 214 has not been modified, that data object 214 is blocked from any type of modification or access other than the replacement until the replacement has been completed. The determining and replacement may be described as atomic from the point of view of the requesters 301 and 302.

The hosted storage system 220 receives and edits the hosted resource (318). For example, the requester 302 may receive the message from the hosted storage system 220 with the ACL 218 that is associated with the data object 214. The requester 302 may edit the ACL 218, and send the ACL 218 and version indicator back to the hosted storage system 220. This may occur, for example during or after the 314 and/or 316.

The hosted storage system 220 receives a second modified copy of the hosted resource (320). For example, the hosted storage system 220 can receive the message with the modified ACL 218 from the requester 302. The hosted storage system 220 determines that the hosted resource has been modified since the copy of the hosted resource was created. For example, the version indicator, or a portion of the version indicator, from the requester 302 is compared by the hosted storage system 220 to the version indicator stored in the metadata 216, and the hosted storage system 220 determines that the version indicators are different.

The hosted storage system 220 modifies a portion of the hosted resource (322). For example, if the version indicator from the requester 302 and the version indicator of the metadata 216 differ only in one field (e.g. Opaque object), but the message from the requester 302 indicates that the requested change involves only a different feature of the data object 214 (e.g. ACL), the indicated portion may be changed. In this case, the ACL 218 may be modified as requested by the requester 302. In another example in which the message from the requester 302 indicates a change to two features of the data object 214 (e.g. Opaque object and ACL), but one of those fields is different from the stored version indicator (e.g. Opaque object), only the feature of the data object 214 that is not different (e.g. the ACL) may be changed.

The hosted storage system 220 provides a rejection message to the requester 302. For example, the hosted storage system 220 may generate a rejection message that indicates the current version of the data object 214, and send that message to the requester 302. The rejection message indicates a modified portion of the hosted resource. For example, if a portion of the data object 214 is changed in 322, and a portion is rejected, and indication of the changed or rejected portions may be included in the message. The requester 302 receives the rejection message is received (324).

Figure 4:
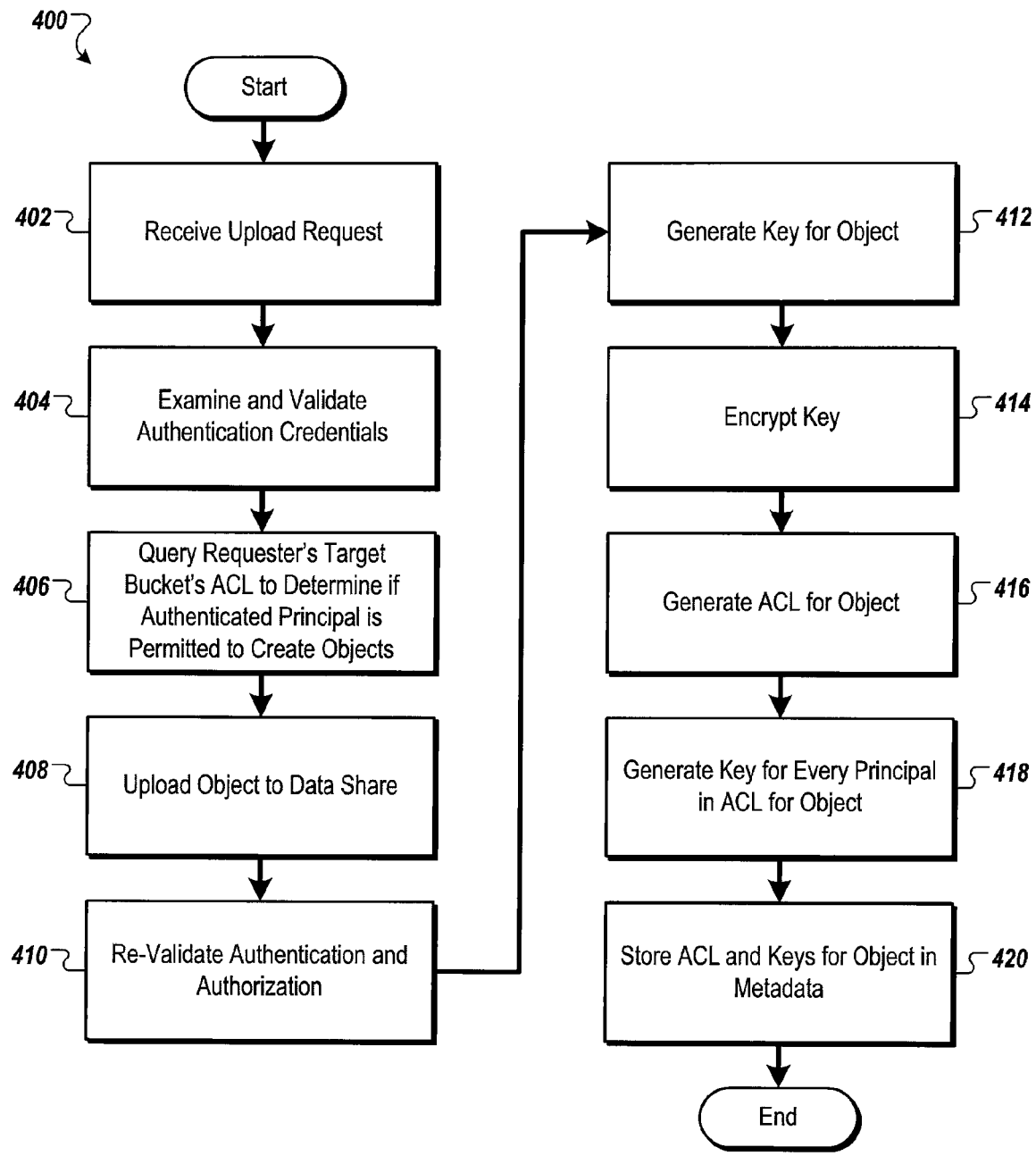
FIG. 4 is a flow chart showing an example of a process for storing data in a hosted storage service.

FIG. 4 is a flow chart showing an example of a process 400 for storing data objects in a hosted storage service. The process 400 can be performed by, for example, the interface frontend 206 and the interface backend 210, and for clarity of presentation, the description that follows uses the system 200 as the basis for describing the process. However, another system, or combination of systems, may be used to perform the process 400.

A request is received by the interface frontend 206 from the client application 203 to store an object (402). The request can include a HTTP PUT or POST request, an authentication credential that authenticates the principal (entity) making the request, a data object, and a target for the object consisting of a bucket and data object name. In some examples, the authentication credentials can include an interoperable authentication header, token, or cookie. The interface frontend can make a RPC to the backend 208 including the request headers.

The interface backend 208 can examine and validate the authentication credentials (404). For example, native credentials (e.g., user ID, token) can be validated using internal validation features of the hosted storage service 220. External credentials (e.g., user names and passwords for another system) can be sent to the associated external system for validation.

The interface backend 208 can query the request's target bucket's ACL 218 to determine if the authenticated principal is permitted to create an object in the bucket (406). For example, the principal or a group the principal is a member of can have the WRITE or FULL_CONTROL role assigned in the bucket's ACL 218, which would allow the principal to create an object in the bucket. If the principal is not authorized to create an object, the request is denied.

Otherwise, the interface backend 208 uploads the object to the target bucket with the target data object name to a datastore 212 (408). In some examples, each bucket is associated with only a single datastore 212, and specifying a target bucket specifies a datastore 212. In some examples, the interface backend 208 can examine the data object or use a parameter in the RPC from the interface frontend 206 to determine which datastore 212 to store the object in, with associated metadata 216 indicating the location of the object (that is, the particular datastore the object is stored in and the object's location in that datastore).

The interface backend 208 re-validates the principal's authentication and authorization (410). To support long-running uploads, expiry times of authentication credentials can be temporarily ignored.

The interface backend 208 generates a new document key request to the keystore 209 for a wrapped key for the newly-uploaded object (412). The new wrapped key is tied to the authentication credentials of the principal of the request. The keystore 209 can also supply an encryption key to encrypt the wrapped key. The interface backend 208 encrypts the wrapped key (414).

The interface backend 208 creates an ACL 218 representing the access control list for the newly created object (416). In some example, a default ACL 218 is used or an ACL 218 can be specified by the request from the client 202.

The interface backend 208 generates a new document key request to the keystore 209 for a wrapped key for every principal (user or group) in the ACL 218 with permissions to read the object or modify the object's ACL 218. Each new wrapped key is tied to a single principal. The keystore 209 can also supply an encryption key to encrypt the wrapped keys, or the interface backend 208 can reuse the encryption key from the step 208.

The interface backend 208 stores the object's ACL 218 and wrapped keys in the object's metadata 216. The encryption key or keys can be discarded by the interface backend 208.

Figure 5:
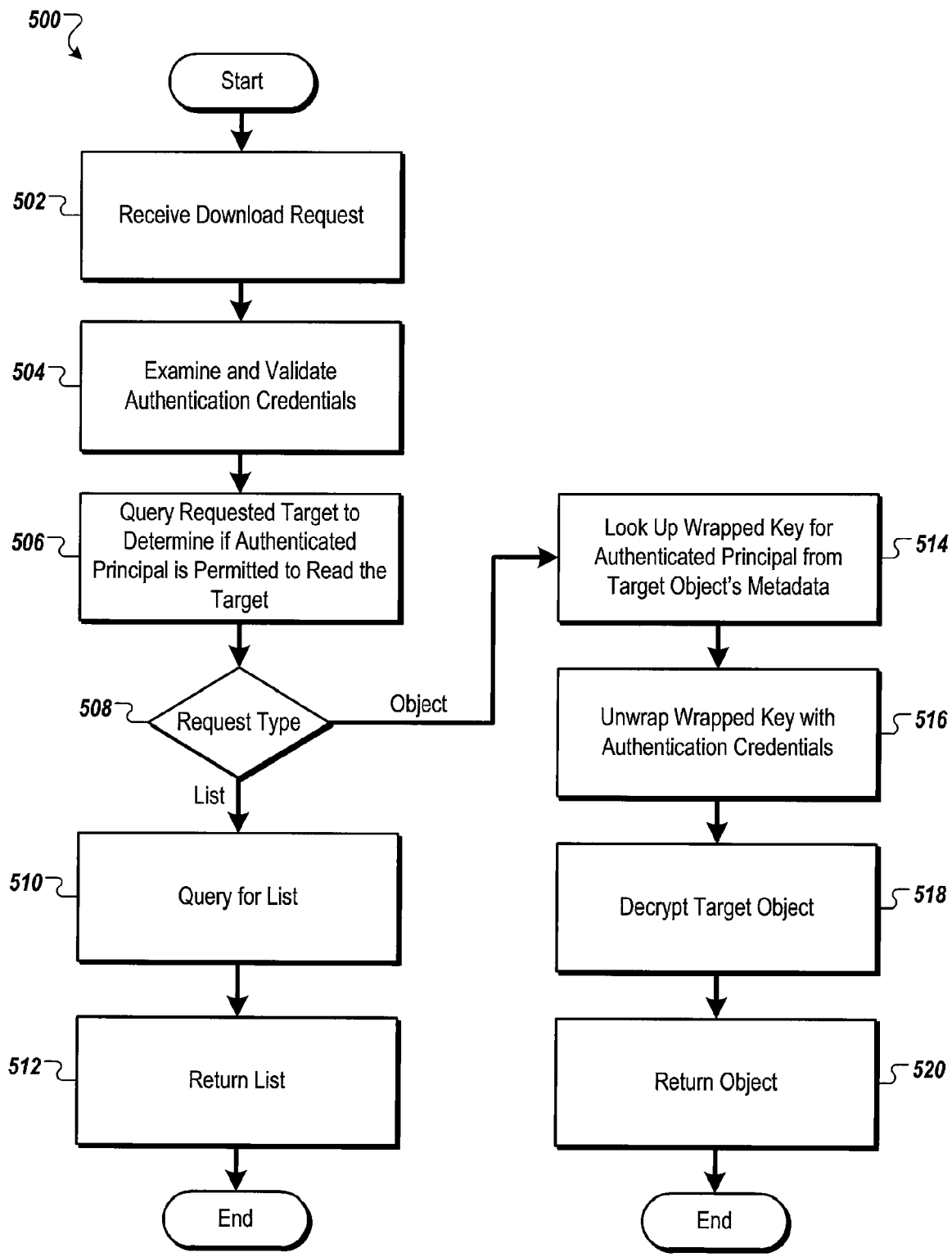
FIG. 5 is a flow chart showing an example of a process for providing data in a hosted storage service.

FIG. 5 is a flow chart showing an example of a process for providing data objects in a hosted storage service. The process 500 can be performed by, for example, the interface frontend 206 and the interface backend 210, and for clarity of presentation, the description that follows uses the system 200 as the basis for describing the process. However, another system, or combination of systems, may be used to perform the process 500.

A request is received by the interface frontend 206 from the client application 203 to download an object (502). The request can include a HTTP GET request, an authentication credential that authenticates the principal (entity) making the request, and a target consisting of a bucket (and optionally data object) name. In some examples, the authentication credentials can include an interoperable authentication header, token, or cookie. The interface frontend can make a RPC to the backend 208 including the request headers.

The interface backend 208 examines and validates the authentication credentials included in the request (504). For example, native credentials (e.g., user ID, token) can be validated using internal validation features of the hosted storage service 220. External credentials (e.g., user names and passwords for another system) can be sent to the associated external system for validation.

The interface backend 208 queries the request's bucket or object ACL 218 to determine if the authenticated principal is permitted to read the target (506). For example, the principal or a group the principal is a member of can have the READ, WRITE or FULL_CONTROL role assigned, which would allow the principal to read or otherwise access the target. If the principal is not authorized to read or access the object, the request is denied.

Otherwise, the interface backend 208 determines if the request is for a bucket or for an object (508). If the request is for a bucket, the interface backend 208 queries for a list of the bucket's contents (510) and the listing is returned to the client application 203 (512).

If the request is for an object, the interface backend 208 looks up the appropriate wrapped key for the given authenticated requestor from the object's metadata 216 (514). The interface backend 208 sends the wrapped key and the authentication credentials to the keystore 209, which can return the decrypted object encryption key to the interface backend 208 (516). The interface backend 208 can fetch and decrypt the target object (518) to be returned to the client application 203 (520).

FIG. 6 is a flow chart showing an example lifecycle 600 of an ACL 218. Although the steps of the lifecycle 600 show an order of steps, it is not implied that each step leads directly to another. The steps shown are a listing of possible steps that may be performed on an ACL 218 in roughly chronological order. The actual order, number, and kind of steps will be dependent on implementation details and usage of the hosted storage system 220.

A bucket or object is created by the backend interface 208 based on requests from the client application 203 (602). The client request can include a bucket name, an object name, and/or an ACL 218. The principal requesting the new bucket or object is authenticated and made the owner of the bucket or object.

If an ACL 218 is specified in the request (604), the specified ACL 218 is associated with the bucket or object. If the specified ACL 218 does not include a {scope, role} pair specifying the principal having FULL_CONTROL, one such {scope, role} pair can be added to the ACL 218. In one implementation, an ACL may be specified in a request by enumerating each scope and role pair to be included in the ACL, or may be specified by reference to the name of a pre-specified or "canned" ACL. A list of pre-specified or 'canned' ACLs 218 is shown in Table 5 Canned ACLs below. The canned ACLs 218 can be cataloged by the hosted storage system 220 and referenced by the client application 203 by name, rather than requiring the request enumerate each scope and role pair.

TABLE 5

Canned ACLs

| Canned ACL Name | {scope, permission} |
| --- | --- |
| private | {creating user or bucket owner, FULL_CONTROL} |
| public-read | {all users, READ} |
| | {bucket owner, FULL_CONTROL} |
| public-read-write | {all users, WRITE} |
| | {bucket owner, FULL_CONTROL} |
| authenticated-read | {all authenticated users, READ} |
| | {bucket owner, FULL_CONTROL} |
| bucket-owner-read [for objects only] | {bucket owner, READ} {object owner, FULL_CONTROL} |
| bucket-owner-full-control [for objects only] | {bucket owner, FULL_CONTROL} {object owner, FULL_CONTROL} |

If an ACL 218 is not specified in the request (604), a default ACL 218 can be used (608). For example, bucket and object creation can default to the "private" canned ACL 218 for authenticated users. For object creation by unauthenticated users, such as for new objects created in a "public-read-write" bucket, a default of "bucket-owner-full-control" can be used.

An ACL 218 can be served, for example, to a principal with READ, WRITE, or FULL_CONTROL of the associated bucket or object (610). For example, a client application 203 can perform a HTTP GET to a target's URI with the query string ?acl to retrieve the ACL associated with the target. The ACL 218 can be serialized and returned to the client application 203.

The serialization may be defined, for example, by the following extended Backus-Naur form. Nonterminals appear in sans serif italics, terminals appear in Courier Bold, { } denote zero or more repetitions, [ ] enclose optional entities, | separates alternatives, and ( ) denote grouping. The terminal symbols canonical-id, email-address, and domain are defined in English below:

```
access-control-list: <AccessControlList> owner entries </AccessControlList>
owner: <Owner> id </Owner>
entries: <Entries> entry { entry } </Entries>
entry: <Entry> ( permission scope | scope permission ) </Entry>
permission: <Permission> ( READ | WRITE | FULL_CONTROL ) </Permission>
scope: <Scope type=UserById> id </Scope>
 | <Scope type=UserByEmail> email </Scope>
 | <Scope type=GroupById> id </Scope>
 | <Scope type=GroupByEmail> email </Scope>
 | <Scope type=GroupByDomain> <Domain> domain </Domain> </Scope>
 | <Scope type=AllUsers/>
 | <Scope type=AllAuthenticatedUsers/>
id: <ID> canonical-id </ID> [ <Name> text </Name> ]
 |[ <Name> text </Name> ] <ID> canonical-id </ID>
email: <EmailAddress> email-address </EmailAddress> [ <Name> text </Name>]
 |[ <Name> text </Name> ] <EmailAddress> canonical-id </EmailAddress>
text: { printable character excluding < and > }
canonical-id: 64 hex digits
email-address: standard RFC 822 email address
domain: standard RFC 822 domain specification
```

A canonical-id or an email-address can identify a user or a group. A canonical-id is the encrypted service id for the user or group. Email addresses are a convenience for specifying canonical ids. In some implementations, the ACLs returned from the system always contain canonical ids. The <Name>text</Name> element may be used for information purposes only such that it is otherwise ignored by the system, and the system does not return it if there is no public name associated with the user or group.

An example serialized ACL 218 is shown below.

```
<AccessControlList>
<Owner>
<ID>a9a7b886d6fd24a52fe8ca5bef65f89a64e0193f23000e241bf9b1c61be666e9</ID>
<Name>chriscustomer</Name>
</Owner>
<Entries>
<Entry><Permission>FULL_CONTROL</Permission>
<Scope type=UserById>
<ID>a9a7b886d6fd24a52fe8ca5bef65f89a64e0193f23000e241bf9b1c61be666e9</ID>
<Name>chriscustomer</Name>
</Scope>
</Entry>
<Entry><Permission>FULL_CONTROL</Permission>
<Scope type=UserById>
<ID>79a59df900b949e55d96a1e698fbacedfd6e09d98eacf8f8d5218e7cd47ef2be</ID>
<Name>Frank</Name>
</Scope>
</Entry>
```

```
<Entry><Permission>FULL_CONTROL</Permission>
<Scope type=UserById>
<ID>de019164ebb0724ff67188e243eae9ccbebdde523717cc312255d9a82498e394a</ID>
<Name>Jose</Name>
</Scope>
</Entry>
<Entry><Permission>READ</Permission><Scope type=AllUsers></Entry>
</Entries>
</AccessControlList>
```

An ACL 218 can be updated, for example by a principal with WRITE or FULL_CONTROL of the associated bucket or object (612). In some examples, a client must read, modify, and write an ACL 218 in order to update an ACL 218. In this example, the ACL 218 is served (610) as part of modification (612). In some implementations, a client application 203 can send ACL update requests to the hosted storage system 220.

Figure 7:
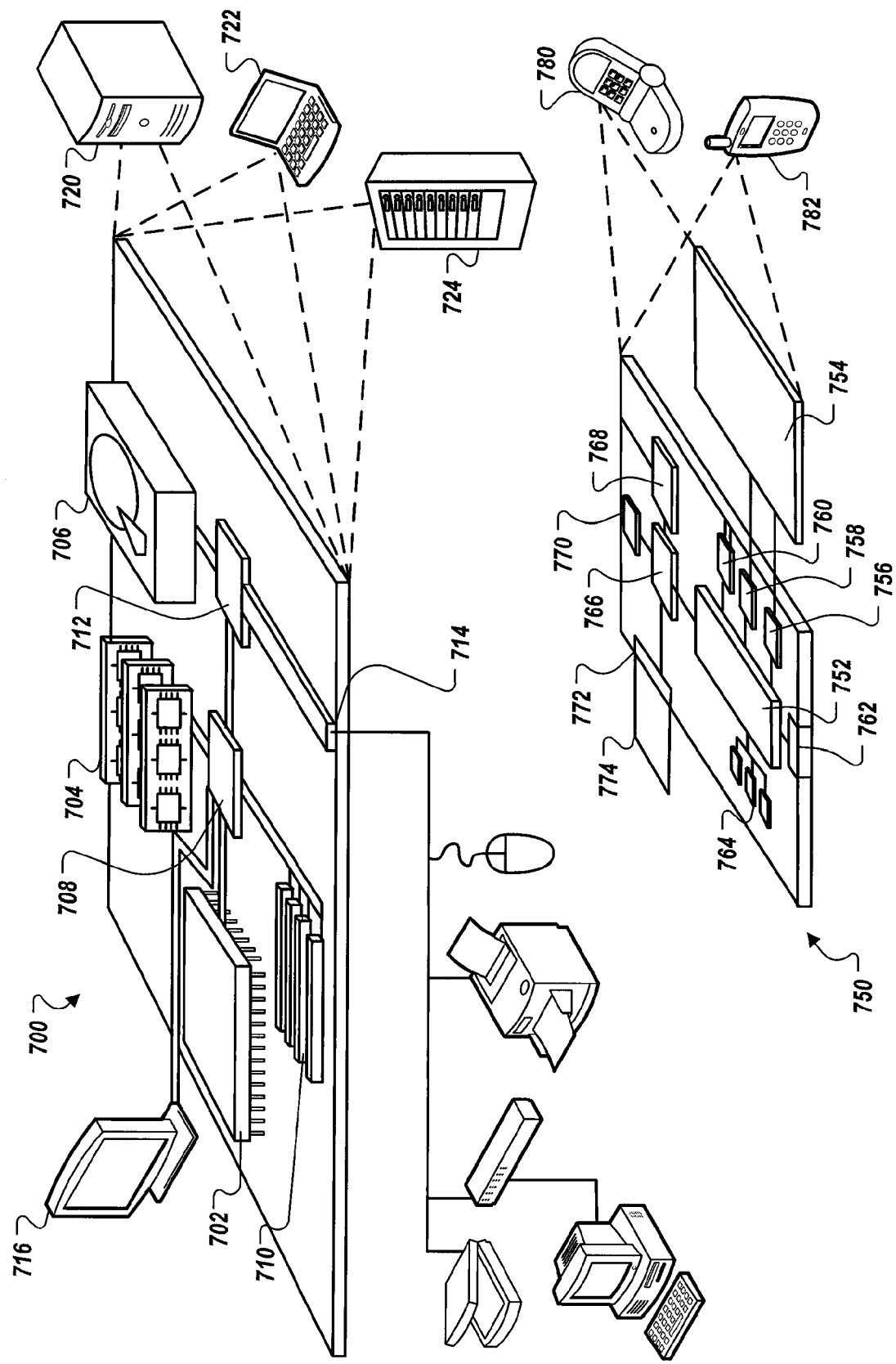
FIG. 7 shows an example of a computing device and a mobile computing device.

FIG. 7 7 shows an example of a computing device 7 700 and a mobile computing device 7 750 that can be used to implement the techniques described here. The computing device 7 700 is intended to represent various forms of digital computers, such as laptops, desktops, workstations, personal digital assistants, servers, blade servers, mainframes, and other appropriate computers. The mobile computing device 7 750 is intended to represent various forms of mobile devices, such as personal digital assistants, cellular telephones, smartphones, and other similar computing devices. The components shown here, their connections and relationships, and their functions, are meant to be examples only, and are not meant to be limiting.

The computing device 7 700 includes a processor 7 702, a memory 7 704, a storage device 7 706, a high-speed interface 7 708 connecting to the memory 7 704 and multiple high-speed expansion ports 7 710, and a low-speed interface 7 712 connecting to a low-speed expansion port 7 714 and the storage device 7 706. Each of the processor 7 702, the memory 7 704, the storage device 7 706, the high-speed interface 7 708, the high-speed expansion ports 7 710, and the low-speed interface 7 712, are interconnected using various busses, and may be mounted on a common motherboard or in other manners as appropriate. The processor 7 702 can process instructions for execution within the computing device 7 700, including instructions stored in the memory 7 704 or on the storage device 7 706 to display graphical information for a GUI on an external input/output device, such as a display 7 716 coupled to the high-speed interface 7 708. In other implementations, multiple processors and/or multiple buses may be used, as appropriate, along with multiple memories and types of memory. Also, multiple computing devices may be connected, with each device providing portions of the necessary operations (e.g., as a server bank, a group of blade servers, or a multi-processor system).

The memory 7 704 stores information within the computing device 7 700. In some implementations, the memory 7 704 is a volatile memory unit or units. In some implementations, the memory 7 704 is a non-volatile memory unit or units. The memory 7 704 may also be another form of computer-readable medium, such as a magnetic or optical disk.

The storage device 7 706 is capable of providing mass storage for the computing device 7 700. In some implementations, the storage device 7 706 may be or contain a computer-readable medium, such as a floppy disk device, a hard disk device, an optical disk device, or a tape device, a flash memory or other similar solid state memory device, or an array of devices, including devices in a storage area network or other configurations. Instructions can be stored in an information carrier. The instructions, when executed by one or more processing devices (for example, processor 7 702), perform one or more methods, such as those described above. The instructions can also be stored by one or more storage devices such as computer- or machine-readable mediums (for example, the memory 7 704, the storage device 7 706, or memory on the processor 7 702).

The high-speed interface 7 708 manages bandwidth-intensive operations for the computing device 7 700, while the low-speed interface 712 manages lower bandwidth-intensive operations. Such allocation of functions is an example only. In some implementations, the high-speed interface 708 is coupled to the memory 704, the display 716 (e.g., through a graphics processor or accelerator), and to the high-speed expansion ports 710, which may accept various expansion cards (not shown). In the implementation, the low-speed interface 712 is coupled to the storage device 706 and the low-speed expansion port 714. The low-speed expansion port 714, which may include various communication ports (e.g., USB, Bluetooth, Ethernet, wireless Ethernet) may be coupled to one or more input/output devices, such as a keyboard, a pointing device, a scanner, or a networking device such as a switch or router, e.g., through a network adapter.

The computing device 700 may be implemented in a number of different forms, as shown in the figure. For example, it may be implemented as a standard server 720, or multiple times in a group of such servers. In addition, it may be implemented in a personal computer such as a laptop computer 722. It may also be implemented as part of a rack server system 724. Alternatively, components from the computing device 700 may be combined with other components in a mobile device (not shown), such as a mobile computing device 750. Each of such devices may contain one or more of the computing device 700 and the mobile computing device 750, and an entire system may be made up of multiple computing devices communicating with each other.

The mobile computing device 750 includes a processor 752, a memory 764, an input/output device such as a display 754, a communication interface 766, and a transceiver 768, among other components. The mobile computing device 750 may also be provided with a storage device, such as a micro-drive or other device, to provide additional storage. Each of the processor 752, the memory 764, the display 754, the communication interface 766, and the transceiver 768, are interconnected using various buses, and several of the components may be mounted on a common motherboard or in other manners as appropriate.

The processor 752 can execute instructions within the mobile computing device 750, including instructions stored in the memory 764. The processor 752 may be implemented as a chipset of chips that include separate and multiple analog and digital processors. The processor 752 may provide, for example, for coordination of the other components of the mobile computing device 750, such as control of user interfaces, applications run by the mobile computing device 750, and wireless communication by the mobile computing device 750.

The processor 752 may communicate with a user through a control interface 758 and a display interface 756 coupled to the display 754. The display 754 may be, for example, a TFT (Thin-Film-Transistor Liquid Crystal Display) display or an OLED (Organic Light Emitting Diode) display, or other appropriate display technology. The display interface 756 may comprise appropriate circuitry for driving the display 754 to present graphical and other information to a user. The control interface 758 may receive commands from a user and convert them for submission to the processor 752. In addition, an external interface 762 may provide communication with the processor 752, so as to enable near area communication of the mobile computing device 750 with other devices. The external interface 762 may provide, for example, for wired communication in some implementations, or for wireless communication in other implementations, and multiple interfaces may also be used.

The memory 764 stores information within the mobile computing device 750. The memory 764 can be implemented as one or more of a computer-readable medium or media, a volatile memory unit or units, or a non-volatile memory unit or units. An expansion memory 774 may also be provided and connected to the mobile computing device 750 through an expansion interface 772, which may include, for example, a SIMM (Single In Line Memory Module) card interface. The expansion memory 774 may provide extra storage space for the mobile computing device 750, or may also store applications or other information for the mobile computing device 750. Specifically, the expansion memory 774 may include instructions to carry out or supplement the processes described above, and may include secure information also. Thus, for example, the expansion memory 774 may be provide as a security module for the mobile computing device 750, and may be programmed with instructions that permit secure use of the mobile computing device 750. In addition, secure applications may be provided via the SIMM cards, along with additional information, such as placing identifying information on the SIMM card in a non-hackable manner.

The memory may include, for example, flash memory and/or NVRAM memory (non-volatile random access memory), as discussed below. In some implementations, instructions are stored in an information carrier. that the instructions, when executed by one or more processing devices (for example, processor 752), perform one or more methods, such as those described above. The instructions can also be stored by one or more storage devices, such as one or more computer- or machine-readable mediums (for example, the memory 764, the expansion memory 774, or memory on the processor 752). In some implementations, the instructions can be received in a propagated signal, for example, over the transceiver 768 or the external interface 762.

The mobile computing device 750 may communicate wirelessly through the communication interface 766, which may include digital signal processing circuitry where necessary. The communication interface 766 may provide for communications under various modes or protocols, such as GSM voice calls (Global System for Mobile communications), SMS (Short Message Service), EMS (Enhanced Messaging Service), or MMS messaging (Multimedia Messaging Service), CDMA (code division multiple access), TDMA (time division multiple access), PDC (Personal Digital Cellular), WCDMA (Wideband Code Division Multiple Access), CDMA2000, or GPRS (General Packet Radio Service), among others. Such communication may occur, for example, through the transceiver 768 using a radio-frequency. In addition, short-range communication may occur, such as using a Bluetooth, WiFi, or other such transceiver (not shown). In addition, a GPS (Global Positioning System) receiver module 770 may provide additional navigation- and location-related wireless data to the mobile computing device 750, which may be used as appropriate by applications running on the mobile computing device 750.

The mobile computing device 750 may also communicate audibly using an audio codec 760, which may receive spoken information from a user and convert it to usable digital information. The audio codec 760 may likewise generate audible sound for a user, such as through a speaker, e.g., in a handset of the mobile computing device 750. Such sound may include sound from voice telephone calls, may include recorded sound (e.g., voice messages, music files, etc.) and may also include sound generated by applications operating on the mobile computing device 750.

The mobile computing device 750 may be implemented in a number of different forms, as shown in the figure. For example, it may be implemented as a cellular telephone 780. It may also be implemented as part of a smart-phone 782, personal digital assistant, or other similar mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms machine-readable medium and computer-readable medium refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term machine-readable signal refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network (LAN), a wide area network (WAN), and the Internet.

The computing system can include clients and servers. A client and server are generally remote from each other and typically interact through a communication network. The relationship of client and server arises by virtue of computer programs running on the respective computers and having a client-server relationship to each other.

Although a few implementations have been described in detail above, other modifications are possible. For example, while a client application is described as accessing the delegate(s), in other implementations the delegate(s) may be employed by other applications implemented by one or more processors, such as an application executing on one or more servers. In addition, the logic flows depicted in the figures do not require the particular order shown, or sequential order, to achieve desirable results. In addition, other actions may be provided, or actions may be eliminated, from the described flows, and other components may be added to, or removed from, the described systems. Accordingly, other implementations are within the scope of the following claims.

What is claimed is:

1. A method performed by one or more processors, the method comprising:
   receiving, at a hosted storage system, a request from a requester to access a hosted resource, the hosted resource including a binary large object, the hosted storage system providing hosted storage to a plurality of clients that are coupled to the hosted storage system, wherein the hosted storage system comprises:
      a datastore configured to store hosted resources;
      a metadata store configured to store a plurality of metadata fields related to hosted resources;
   creating a copy of the hosted resource;
   providing a copy message comprising the copy of the hosted resource to the requester;
   providing a version indicator of the hosted resource to the requester, the version indicator comprising i) a value being associated with a version of the hosted resource and ii) for each of the plurality of metadata fields associated with the hosted resource, a corresponding value being associated with a version of the corresponding metadata field;
   maintaining the hosted resource in the hosted storage system after the requester receives the copy of the hosted resource;
   receiving a message from the requester, the message i) indicating a modification of a metadata field of the hosted resource and ii) comprising the provided version indicator;
   determining that the indicated metadata field of the hosted resource has not been modified since the copy of the hosted resource was created by comparing the value corresponding to the indicated metadata field of the provided version indicator with a current value corresponding to the indicated metadata field of a current version indicator of the hosted resource;
   modifying, in response to the determining and in the hosted storage system, the indicated metadata field of the hosted resource according to the message received from the requester; and
   wherein the request from a requester, the copy message, and the message from the requester are Hypertext Transfer Protocol or Hypertext Transfer Protocol Secure messages.

2. The method of claim 1, wherein:
   modifying comprises incrementing the value corresponding to the indicated metadata field.

3. The method of claim 1, wherein comparing value corresponding to the indicated metadata field of the provided version indicator with a current value corresponding to the indicated metadata field of a current version indicator of the hosted resource comprises comparing only the value corresponding to the indicated metadata field of the provided version indicator with a current value corresponding to the indicated metadata field of a current version indicator of the hosted resource.

4. The method of claim 1, wherein the determining and the replacing are performed as part of a single operation.

5. The method of claim 1, the method further comprising:
   receiving, at the hosted storage system and before the replacing, a second request from a second requester to access a hosted resource;
   creating a second copy of the hosted resource;
   providing the second copy of the hosted resource to the second requester for modification;
   receiving a second modified copy of the hosted resource, the second modified copy created by the second requester;
   determining that the hosted resource has been modified since the second copy of the hosted resource was created; and
   providing, to the second requester, a modification rejection message.

6. The method of claim 5, the method further comprising:
   modifying a portion of the hosted resource; and
   wherein the modification rejection message indicates a modified portion of the hosted resource.

7. A method performed by one or more processors, the method comprising:
   receiving, at a hosted storage system, a request from a requester to access a hosted resource, the hosted resource including a binary large object, the hosted storage system providing hosted storage to a plurality of clients that are coupled to the hosted storage system, wherein the hosted storage system comprises:
      a datastore configured to store hosted resources;
      a metadata store configured to store a plurality of metadata fields related to hosted resources;
   creating a copy of the hosted resource;
   providing a copy message comprising the copy of the hosted resource to the requester;
   providing a version indicator of the hosted resource to the requester, the version indicator comprising i) a value being associated with a version of the hosted resource and ii) for each of the plurality of metadata fields associated with the hosted resource, a corresponding value being associated with a version of the corresponding metadata field;
   maintaining the hosted resource in the hosted storage system after the requester receives the copy of the hosted resource;

receiving a message from the requester, the message i) indicating a modification of a metadata field of the hosted resource and ii) comprising the provided version indicator;

determining that the indicated metadata field of the hosted resource has not been modified since the copy of the hosted resource was created by comparing the value corresponding to the indicated metadata field of the provided version indicator with a current value corresponding to the indicated metadata field of a current version indicator of the hosted resource;

modifying, in response to the determining and in the hosted storage system, the indicated metadata field of the hosted resource according to the message received from the requester; and wherein the request from a requester, the copy message, and the message from the requester are Hypertext Transfer Protocol or Hypertext Transfer Protocol Secure messages.

8. A computer system comprising:
a hosted storage system comprising:
  a datastore configured to store hosted resources;
  a metadata store configured to store a plurality of metadata fields related to hosted resources
  wherein the hosted storage system is configured to:
    provide hosted storage to a plurality of clients that are coupled to the hosted storage system;
    receive a request from a requester to access a hosted resource, the hosted resource including a binary large object;
    create a copy of the hosted resource;
    provide a copy message comprising the copy of the hosted resource to the requester;
    provide a version indicator of the hosted resource to the requester, the version indicator comprising i) a value being associated with a version of the hosted resource and ii) for each of the plurality of metadata fields associated with the hosted resource, a corresponding value being associated with a version of the corresponding metadata field;
    maintain the hosted resource in the hosted storage system after the requester receives the copy of the hosted resource;
    receive a message from the requester, the message i) indicating a modification of a metadata field of the hosted resource and ii) comprising the provided version indicator; and
    determine that the indicated metadata field of the hosted resource has not been modified since the copy of the hosted resource was created by comparing the value corresponding to the indicated metadata field of the provided version indicator with a current value corresponding to the indicated metadata field of a current version indicator of the hosted resource; and
    modify, in response to the determining and in the hosted storage system, the indicated metadata field of the hosted resource according to the message received from the requester; and
  a requestor configured to:
    provide to the hosted storage system the request;
    receive from the hosted storage system the copy message;
    modify the copy of the hosted resource; and
    provide to the hosted storage system the message; and
  wherein the request from a requester, the copy message, and the message from the requester to access a hosted resource are Hypertext Transfer Protocol or Hypertext Transfer Protocol Secure messages.

9. The system of claim 8, wherein:
modifying comprises incrementing the value corresponding to the indicated metadata field.

10. The system of claim 9, wherein comparing value corresponding to the indicated metadata field of the provided version indicator with a current value corresponding to the indicated metadata field of a current version indicator of the hosted resource comprises comparing only the value corresponding to the indicated metadata field of the provided version indicator with a current value corresponding to the indicated metadata field of a current version indicator of the hosted resource.

11. The system of claim 8, wherein the determining and the replacing are performed as part of a single operation.

12. The system of claim 8, wherein the hosted storage system is further configured to:
receive, at the hosted storage system and before the replacing, a second request from a second requester to access a hosted resource;
create a second copy of the hosted resource;
provide the second copy of the hosted resource to the second requester for modification;
receive a second modified copy of the hosted resource,
determine that the hosted resource has been modified since the second copy of the hosted resource was created; and
provide, to the second requester, a modification rejection message; and
the system further comprising the second requester configured to:
provide to the hosted storage system the second request;
receive from the hosted storage system the copy of the hosted resource;
modify the copy of the hosted resource; and
provide to the hosted storage system the second modified copy of the hosted resource; and
receive the modification rejection message.

13. The system of claim 12, wherein the hosted storage system is further configured to:
modify a portion of the hosted resource; and
wherein the modification rejection message indicates a modified portion of the hosted resource.

14. A system comprising:
a hosted storage system comprising:
  a datastore configured to store hosted resources;
  a metadata store configured to store a plurality of metadata fields related to hosted resources
  wherein the hosted storage system is configured to:
    receive a request from a client system to access a hosted resource, the hosted storage system providing hosted storage to a plurality of clients that are coupled to the hosted storage system;
    create a copy of the hosted resource;
    provide a copy message comprising the copy of the hosted resource and a version indicator of the hosted resource to the client system, the version indicator comprising comprising i) a value being associated with a version of the hosted resource and ii) for each of the plurality of metadata fields associated with the hosted resource, a corresponding value being associated with a version of the corresponding metadata field;
    maintain the hosted resource after the client system modifies the copy of the hosted resource;

receive a message from the client system, the message i) indicating a modification of a metadata field of the hosted resource and ii) comprising the provided version indicator;

determine that the indicated metadata field of the hosted resource has not been modified since the copy of the hosted resource was created by comparing the value corresponding to the indicated metadata field of the provided version indicator with a current value corresponding to the indicated metadata field of a current version indicator of the hosted resource;

modify, in response to the determining that the hosted resource has not been modified since the copy of the hosted resource was created, the indicated metadata field of the hosted resource according to the message received from the requester; and increment, in response to the determining and in the hosted storage system, the indicated metadata field of the version indicator;

a client system configured to:

send the request to access the hosted resource to the hosted storage system;

receive the copy message comprising the copy of the hosted resource and the version indicator of the hosted resource;

modify the copy of the hosted resource to generate the modified copy of hosted resource; and send the message comprising a modified copy of the hosted resource and the provided version indicator to the hosted storage system.

* * * * *